UNITED STATES PATENT OFFICE.

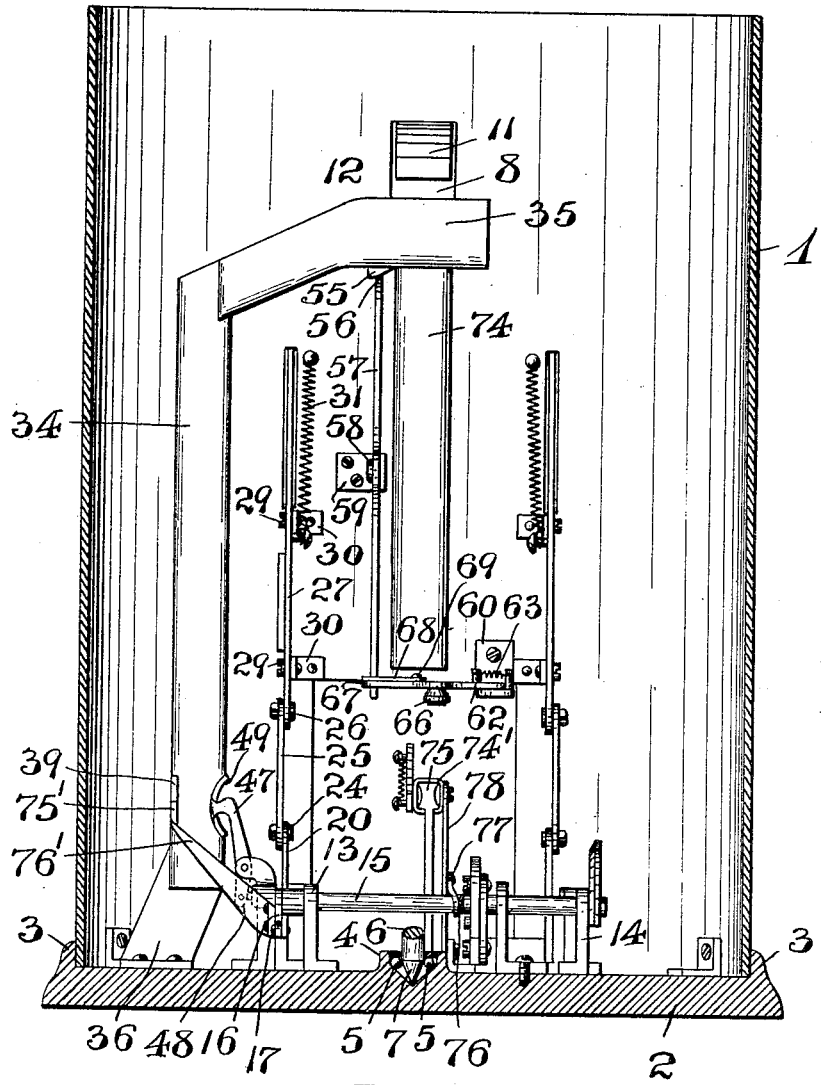

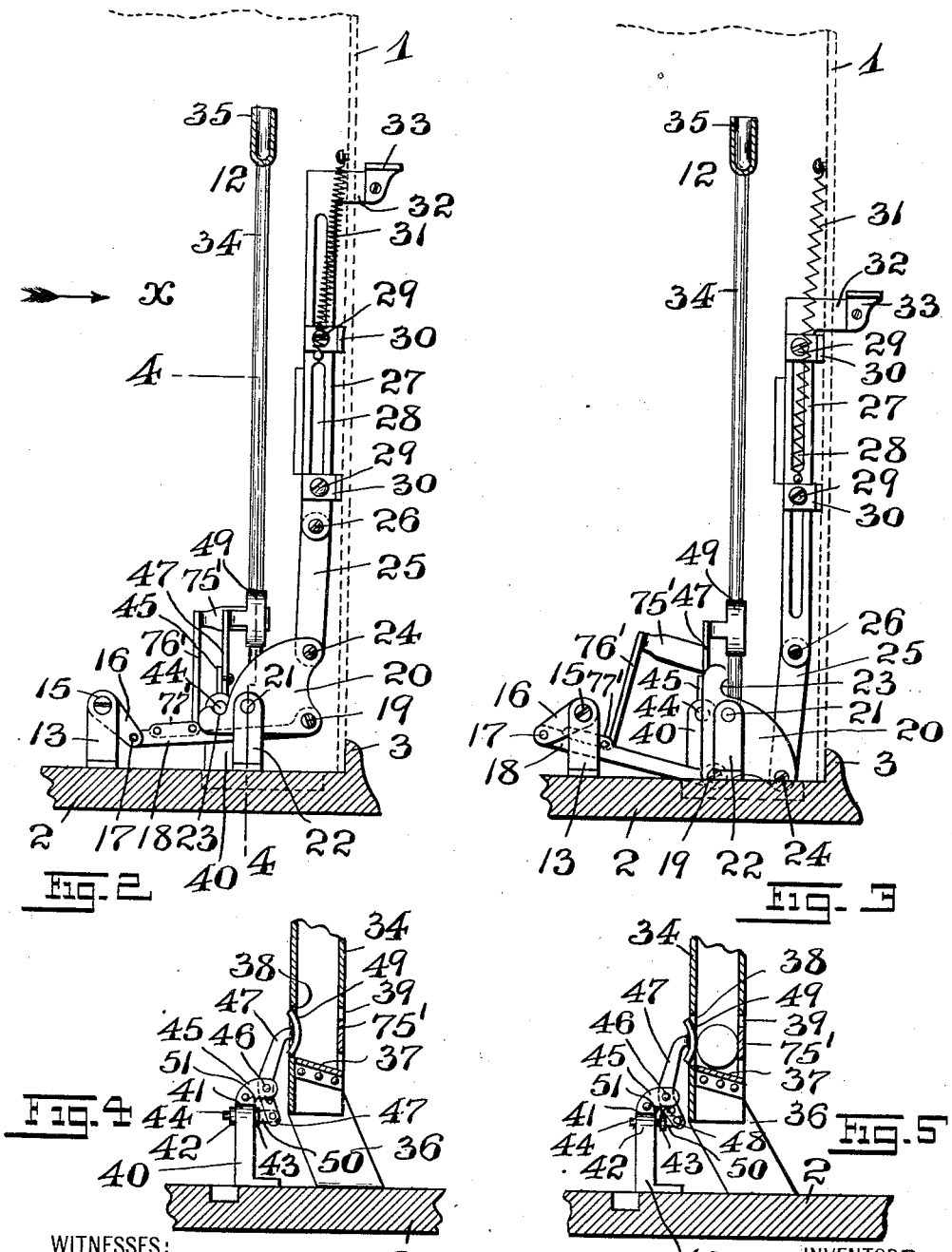

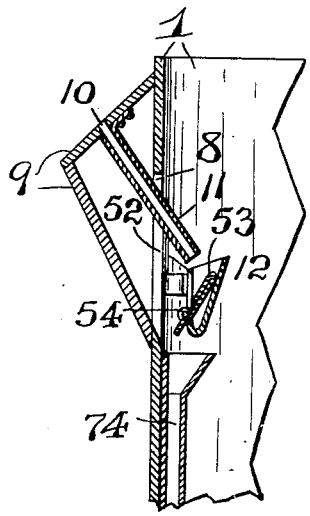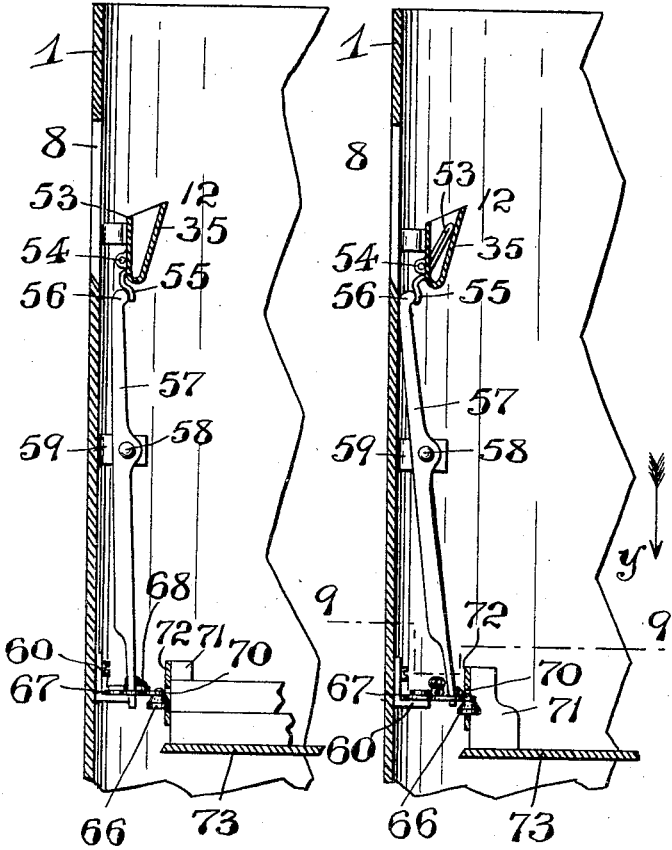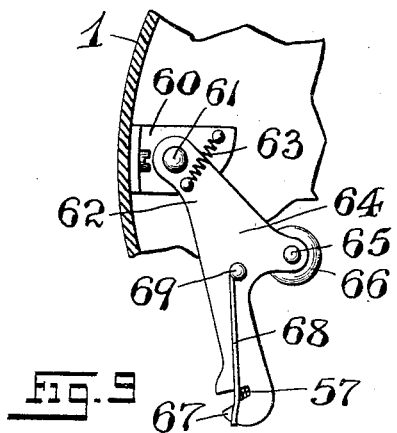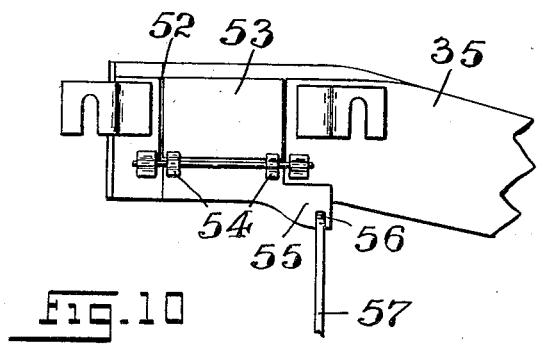

FREDERICK G. AXT AND BERTRAM B. GOODRICH, OF NEWARK, NEW JERSEY, ASSIGNORS OF ONE-THIRD TO WILLIAM J. BIRKEN, OF NEWARK, NEW JERSEY.

VENDING APPARATUS OR MACHINE.

1,053,897. Specification of Letters Patent. Patented Feb. 18, 1913.

Original application filed July 24, 1911, Serial No. 640,053. Divided and this application filed June 6, 1912. Serial No. 701,951.

*To all whom it may concern:*

Be it known that we, FREDERICK G. AXT and BERTRAM B. GOODRICH, citizens of the United States, residing at Newark, in the county of Essex and State of New Jersey, have invented certain new and useful Improvements in Vending Apparatus or Machines; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in vending machines; and, the present invention is in the nature of a division of our former application for Letters-Patent for improvement in vending machines, filed July 24th, 1911, Serial Number 640,053.

Our present invention has for one of its principal objects to provide a novel and simply constructed vending-machine, the mechanism of which comprises a normally locked rock-plate, a coin-receiving chute, and means connected with the chute and adapted to be actuated by a coin, whereby the disengaged relation of the locking means from the rock-plate is produced.

The invention has for its further and very important object, a novel arrangement of coin-chute comprising a chute-member formed with an open or cut-away portion, in which there is a gate pivotally arranged with relation to said open portion, and means coöperating with said gate and having a member adapted to be brought in contact or engagement with a package in the frame-work of the machine to close said gate, and when not in such contact or engagement with a package, causing the said gate to assume an opened relation to the chute-member, whereby the deposited coin is returned to the prospective purchaser.

Other objects of this invention not at this time more particularly enumerated will be clearly understood from the following detailed description of the said invention.

With the various objects of the said invention in view, the invention consists in the novel arrangements and combinations of the various devices and parts, as well as in the details of the construction of the same, all of which will be more fully described in the following specification, and then finally embodied in the clauses of the claim which are appended to and which form an essential part of the said specification.

The invention is clearly illustrated in the accompanying drawings, in which:—

Figure 1 is a central vertical transverse sectional representation of the shell or casing of a vending apparatus or machine of the general construction set forth in said application for Letters-Patent, Serial Number 640,053, with the cover-member of the main shell or casing and the rotary goods-containing frame-work of the machine, omitted from said view, but illustrating in connection with said view, and in elevation, the general arrangement of the devices and parts embodying the principles of the present invention. Fig. 2 is a detail vertical sectional representation, on an enlarged scale, showing in part an edge view and cross-sectional representation of the coin-chute, a rock-shaft and a normally locked rock-plate, with means for operating the same, when the rock-plate is released, and also showing in connection with the coin-chute, the mechanism which is adapted to be actuated by a deposited coin, for releasing the said rock-plate; Fig. 3 is a similar representation of the parts illustrated in said Fig. 2, but representing the said parts in their operated relation; Fig. 4 is a detail sectional representation, taken on line 4—4 in said Fig. 2, looking in the direction of the arrow $x$, with certain parts of the mechanism represented in said Fig. 2, omitted from said Fig. 4; and Fig. 5 is a similar view of the said parts represented in said Fig. 4, but showing the relative positions of the said parts, when a coin has been lodged in the bottom of the said coin chute. Fig. 6 is a detail vertical section of the upper coin-receiving portion of the shell or casing of the vending-machine, and portions of the coin-chute, the flap or gate being shown in its opened relation, to direct the coin into an auxiliary chute for delivery to the outside of the shell or casing. Fig. 7 is a detail vertical section of a portion of the shell or casing of the apparatus, and a transverse section of the upper portion of the coin-chute and of a portion of the goods-containing frame-work, said view showing in connection therewith, the closed position of a gate or flap pivotally connected with the coin-chute, and in side elevation the mechanism in engagement with said gate or flap, for delivering the coin to the mechanism to be operated by the coin, as long as there is a package contained in the goods or package-containing column of the rotary frame-work of the vending machine; and Fig. 8 is a sectional representation similar to that represented in said Fig. 7, but showing the position of the pivoted gate or flap when there is no package remaining in the goods or package-containing column of the said rotary frame-work. Fig. 9 is a detail horizontal section, taken on line 9—9 in said Fig. 8, looking in the direction of the arrow $y$, with certain parts of the mechanism shown in said Fig. 8 omitted from said Fig. 9; and Fig. 10 is a detail face view of one of the coin-chute members provided at its side with an open or cut-away part and a pivoted or hinged closing gate-like member or flap arranged in said open part.

Similar characters of reference are employed in all of the said above described views, to indicate corresponding parts.

Referring now to the said figures of the drawings, the reference-character 1 indicates a suitably shaped shell or casing which is suitably mounted upon a base-plate 2, and is surrounded by a flange, as 3, with which the said base-plate is provided. The upper part of the shell is provided with the vertical shaft or spindle-supporting disk or frame, and the glass-closure of our former application, Serial Number 640,053, this disk or frame and the glass-closure, however, being omitted from the present drawings.

The base-plate 2 is provided with the centrally disposed socketed hub 4, in which are arranged a number of anti-friction balls 5 which form with said hub a suitable pedestal-bearing for the lower and preferably pointed end-portion 7 of a vertical shaft or spindle 6, and upon which is mounted, in the manner of our said application 640,053, the goods-carrying frame, the upper portion of the said shaft or spindle, as well as the said goods-carrying frame being omitted from the present drawings. Other parts of the mechanism, such as the means for initially producing the intermittent rotary movements of the goods-containing cylinder or frame-work are also omitted from the drawings of the present application, or are shown in part only. In its upper front portion the said shell or casing is provided with a suitably formed opening 8, see Figs. 6, 7 and 8 of the drawings, the said opening having arranged thereover a suitably formed coin-receiver in the form of a hollow casting 9 which is provided with a coin-receiving slot 10 and an inwardly extending coin-directing chute 11 which passes through the opening 8 and terminates directly in front of the main coin-delivering chute 12 of the vending machine or apparatus.

The coin-operated mechanism, which embodies the principal features of the present invention comprises a pair of brackets or posts, as 13 and 14 which are suitably mounted upon the said base-plate 2, said brackets having bearing-portions in which is oscillatorily supported a rock-shaft 15. This shaft 15 is provided at one end thereof with a crank 16, with which is pivotally connected by means of a pivot or pin 17, a link 18, said link being also pivotally connected by means of a pivot or pin 19 with a rock-plate 20. This rock-plate is pivotally mounted upon a pivot or pin 21 carried by a bracket or post 22 which is also suitably secured upon said base-plate 2, said rock-plate 20 being provided in its upper marginal edge-portion with a recess or depression 23, the purpose of which will be presently more fully described. The said rock-plate 20 is also provided with another pivot or pin 24, with which is pivotally connected a link 25, said link 25 being pivotally connected by means of a pivot or pin 26, with a vertically moving reciprocatory slide, as 27. This slide has an elongated opening or slot 28 in which are arranged the shanks of screws or pins 29 with which certain brackets 30, or other fastening devices, which are suitably secured upon the inner face of the shell or casing 1, are provided, so that the said slide may be capable of its reciprocatory movements. That the said slide 27 may be pushed or forced into the lowered position shown in Fig. 3 of the drawings, against the action of a coiled spring 31, which returns these parts to their normal initial positions, after operation, the said slide is made with a forwardly extending member 32 which projects from a suitably formed slot in the shell or casing 1, said member being provided with a suitable finger-piece 33 for the depression of the slide.

The operation of the mechanism which is mainly to oscillate the rock-shaft 15, will be clearly understood from an inspection of Figs. 2 and 3 of the drawings. Normally, however, this mechanism is locked against movement until a coin of the proper denomination is inserted in the coin-receiving slot 10 of the hollow casting 9, and directed by means of the coin-directing chute 11 into the main coin-chute 12. This chute consists, essentially of two main parts 34 and 35, the part 34 being made in the form of a vertical piece of tubing of oblong cross-section, said part being supported in its vertical position by means of a bracket 36 which is suitably secured and mounted upon the base-plate 2. The lower end-portion of said tubing 34 is closed by means of a plate, as 37, which inclines in a downward direction from an opening 38 in the one narrow edge of the tubing to a coin-delivery opening 39 in the opposite narrow edge of said tubing. Suitably connected with the upper end-portion of the said part 34 is the part 35, said part being made in the form of a partly horizontal and partly inclined duct, and the higher and horizontal portion of said part or duct 35 terminating directly back of the opening 8 in the shell or casing 1, and beneath the delivery-end of the coin-directing chute 11, substantially as shown in Figs. 1 and 6 of the drawings.

The means for locking the rock-shaft operating-mechanism against movement until a coin has been deposited in the lower portion of the part or tube 34, and rests upon the plate 37, consists, essentially, of a bracket or post 40 which is suitably mounted upon the base-plate 2, said bracket or post 40 being provided with a bearing-portion 41 in which is slidably arranged a pin 42. This pin 42 is provided with an annular flange 43 bearing normally against one side of the said bracket or post 40, and has a reduced end-portion, as 44, which normally extends into and rests within the previously mentioned recess or depression 23 in the upper marginal edge of the rock-plate 20, so as to positively prevent any movement of said rock-plate and the parts connected therewith. The said bracket or post 40 is provided with an arm, as 45, with which is pivotally connected, by means of a pin or pivot 46, a bell-crank comprising the arm-members 47 and 48. The arm 47 is provided with a curved plate 49 which normally closes the opening 38 of the part or tubing 34, substantially in the manner illustrated in Fig. 7 of the drawings, and the arm 48 of said bell-crank is pivotally connected with the end-portion 50 of the pin 42, substantially as shown, a spring, as 51, being arranged between and connected with the arm 45 and the arm-member 48 to normally retain these parts in their respective positions for closing the opening 38 and locking the rock-shaft operating-mechanism against movement. As the coin has become lodged in the lower portion of the part or tube 34, the edge of the coin bears upon the convex surface of the closing plate 49 and moves the same slightly away from the opening 38, thus actuating the bell-crank and causing the end-portion 44 of the pin 42 to be withdrawn from its holding or locking engagement with the recess or depression 23 in the upper marginal edge of the rock-plate 20, the coils of the spring 51 becoming distended, and the parts remaining in the positions shown in Fig. 5 of the drawings, until the coin has passed from the opening 39 of the part or tube 34. The rock-shaft operating-mechanism can now be operated, by the depression of the slide 27, as will be clearly understood, thus permitting the rock-shaft 15 to actuate the package-ejecting mechanism in the manner set forth in the specification of our former application, Serial Number 640,053.

In order that the operator may not lose his or her coin, after it has been deposited in the coin-chute, and when there is but one package remaining in the space of the goods or package-containing cylinder or frame-work rotated into position, we have devised in connection with the coin-chute, the mechanism illustrated more particularly in Figs. 6, 7, 8 and 9 of the drawings. As shown, the part 35 of the coin-chute, at a point in alinement with the discharge-end of the coin-directing chute 12, is cut-away, as at 52, and pivotally disposed in this cut-away part is a gate 53. This gate is provided at a suitable point near its lower marginal edge, and extending in a downward direction preferably from one of its hinge-ears 54, with a projection or finger 55 which is engaged by the upper end-portion 56 of a rod 57 which is adapted to oscillate upon a pin 58, connected with a bracket 59, or other suitable means, arranged upon the inner surface of the shell or casing 1. The reference-character 60 indicates another bracket in the lower portion of said shell or casing at a point located in close proximity to the delivery-opening in said shell or casing 1. This bracket 60 carries a pivot-pin or post 61 upon which is oscillatorily arranged a swing-plate or element 62 which is also connected with the said bracket 60 by means of a coiled spring 63. The said plate or element 62 also has an arm or projection 64, carrying a pivot-pin 65 upon which is mounted a small roller 66, and is provided also with a hook-shaped portion 67, and a flat spring 68 which is secured at its one end by means of a pin 69 to said plate or member 62, and has its other end-portion extending directly over the said hook-shaped portion 67, substantially as shown in Fig. 19 of the drawings. The lower end-portion of the said rod 57 herein-above mentioned extends into the said hook-shaped portion 67 and is operatively retained therein by the action of the spring 68 bearing laterally against the said lower end-portion of the rod 57.

Under normal conditions, when there are at least two packages remaining in the goods or package-receiving space of the rotary cylinder or frame-work, as the latter is rotated into place, in the manner described in our former application, Serial Number 640,053, the said roller 66 rolls in front of and into an opening 70 formed between the bars or front plates 72 of a bracket-like device 71 mounted upon the disk-like plate 73 of the goods-containing cylinder or frame-work, as clearly shown in Fig. 7 of the drawings. Thus, it will be seen, that when the said roller 66 engages with the next lowest package, the gate 53 will be caused to close the cut-away part 54 of the chute-member 35, so that the deposited coin will pass directly back of said gate 53 into the chute-member 35 and thence into and down the chute-member 34 for the purposes hereinbefore fully stated. When, however, there is but one package left, the spring 63 will cause the various parts to assume the relative positions shown in Fig. 8 of the drawings, the gate 53 extending angularly into the chute-member 35, as represented, and a coin coming from the coin-directing chute 11 will pass directly upon the outer face of said gate 53, will drop from the said gate into the upper open end of a vertical chute 74, from which the coin drops into the delivery-opening of the shell or casing 1, so as to again be taken possession of by the operator.

The mechanism for ejecting the lower package from the column of goods or packages, forming the principal feature of our former application, Serial Number 640,053, in the present case is indicated in Fig. 1 of the drawings in a general manner only, and comprises the guide-portion 74' and reciprocatory slide 75, which is moved, during the oscillations of the rock-shaft 15 by an arm 76 with which is pivotally connected a link 77, and by means of which a bar or rod 78, which is pivotally connected with the base-plate 2, as represented in our said former application, Serial Number 640,053, is caused to rock and thereby actuate the said reciprocatory slide to eject the lowest package from the column of packages. After the coin has become located in the lower portion of the part of the tube 34, it is retained in the position shown in Fig. 5 of the drawings by the previously mentioned closing plate 49, and a second plate 75' which is arranged in the said opening 39 of the tube 34; but, being connected with the link 18 by means of an arm 76' and the part 77, said closing plate 75' is withdrawn from the said opening 39 to permit the coin to roll through the said opening 39 from the said tube 34, immediately upon the actuation of the mechanism shown in Fig. 2, to the position of the parts thereof shown in Fig. 3 of the drawings.

We are fully aware that changes may be made in the general arrangements and combinations of the various devices and parts, as well as in the details of the construction of the said parts, without departing from the scope of the present invention as set forth in the foregoing specification and as defined in the clauses of the claim which are appended to the said specification. Hence, we do not limit our invention to the exact arrangements and combinations of the devices and parts as described in the said specification, nor do we confine ourselves to the exact details of the construction of the said parts as illustrated in the accompanying drawings.

We claim:—

1. In a vending machine, the herein-described means for locking an oscillatory rock-plate, consisting of a post formed with a bearing-portion, a lock-pin slidably arranged in said bearing-portion, said lock-pin having its respective end-portions projecting from the opposite ends of said bearing-portion, an arm extending from said post, a coin-actuated bell-crank pivoted upon said arm, said bell-crank being pivotally connected with the one end-portion of said lock-pin, and a spring between said bell-crank and said post, substantially as and for the purposes set forth.

2. In a vending machine, the herein-described means for locking an oscillatory rock-plate, consisting of a post formed with a bearing-portion, a lock-pin slidably arranged in said bearing-portion, said lockpin having its respective end-portions projecting from the opposite ends of said bearing-portion, an arm extending from said post, a coin-actuated bell-crank pivoted upon said arm, said bell-crank being pivotally connected with the one end-portion of said lock-pin, and a spring between said bell-crank and said post, combined with a sector provided with a cam-like surface-portion in slidable engagement with the other end-portion of said lock-pin, substantially as and for the purposes set forth.

3. In a vending machine, the combination, with the shell or casing thereon and a goods-containing frame-work, of a coin-chute comprising a chute-member formed with an open or cut-away portion, a gate pivotally arranged with relation to said open portion, and means connected with said gate having a member adapted to be brought into engagement with a package in said frame-work to close said gate, and when not in engagement with a package causing said gate to assume an opened relation to said chute-member.

4. In a vending machine, the combination, with the shell or casing thereof and a goods-containing frame-work, of a coin-chute comprising a chute-member formed with an open or cutaway portion, a gate pivotally arranged with relation to said open portion, an arm pivotally connected with said gate, a rod oscillatorily arranged in the casing of the vending machine, and pivotally connected at its upper end-portion with said arm, a swing-plate with which the lower end-portion of said rod is connected, and means connected with said swing-plate adapted to be brought into engagement with a package in said frame-work to close said gate, and when not in engagement with a package causing said gate to assume an open relation to said chute-member.

5. In a vending machine, the combination, with the shell or casing thereof and a goods-containing frame-work, of a coin chute comprising a chute-member formed with an open or cut-away portion, a gate pivotally arranged with relation to said open portion, an arm pivotally connected with said gate, a rod oscillatorily arranged in the casing of the vending machine, and pivotally connected at its upper end-portion with said arm, a swing-plate with which the lower end-portion of said rod is connected, and means connected with said swing-plate adapted to be brought into engagement with a package in said frame-work to close said gate, and when not in engagement with a package causing said gate to assume an open relation to said chute-member, consisting of an arm projecting from said swing-plate, and a roller mounted upon said arm, said roller being adapted to be brought into rolling engagement with said package.

6. In a vending machine, the combination, with the shell or casing thereon and a goods-containing frame-work, of a coin-chute comprising a chute-member formed with an open or cut-away portion, a gate pivotally arranged with relation to said open portion, and means connected with said gate having a member adapted to be brought into engagement with a package in said frame-work to close said gate, and when not in engagement with a package causing said gate to assume an opened relation to said chute-member, and a vertical chute within said shell or casing, said chute leading from said gate to a goods-delivery opening with which said shell or casing is provided, substantially as and for the purposes set forth.

7. In a vending machine, the combination, with the shell or casing thereon and a goods-containing frame-work, of a coin-chute comprising a chute-member formed with an open or cutaway portion, a gate pivotally arranged with relation to said open portion, an arm pivotally connected with said gate, a rod oscillatorily arranged in the casing of the vending machine, and pivotally connected at its upper end-portion with said arm, a swing-plate with which the lower end-portion of said rod is connected, and means connected with said swing-plate adapted to be brought into engagement with a package in said frame-work to close said gate, and when not in engagement with a package causing said gate to assume an open relation to said chute-member, and a vertical chute within said shell or casing, said chute leading from said gate to a goods-delivery opening with which said shell or casing is provided, substantially as and for the purposes set forth.

8. In a vending machine, the combination, with the shell or casing thereof and a goods-containing frame-work, of a coin-chute comprising a chute-member formed with an open or cut-away portion, a gate pivotally arranged with relation to said open portion, an arm pivotally connected with said gate, a rod oscillatorily arranged in the casing of the vending machine, and pivotally connected at its upper end-portion with said arm, a swing-plate with which the lower end-portion of said rod is connected, and means connected with said swing-plate adapted to be brought into engagement with a package in said frame-work to close said gate, and when not in engagement with a package causing said gate to assume an open relation to said chute-member, consisting of an arm projecting from said swing-plate, and a roller mounted upon said arm, said roller being adapted to be brought into rolling engagement with said package, and a vertical chute within said shell or casing, said chute leading from said gate to a goods-delivery opening with which said shell or casing is provided, substantially as and for the purposes set forth.

In testimony that we claim the invention set forth above we have hereunto set our hands this first day of June 1912.

FREDERICK G. AXT.
BERTRAM B. GOODRICH.

Witnesses:
   FREDK. C. FRAENTZEL,
   FREDK. H. W. FRAENTZEL.

---

Copies of this patent may be obtained for five cents each, by addressing the "Commissioner of Patents, Washington, D. C."